US008804795B2

(12) United States Patent
Gilberton et al.

(10) Patent No.: US 8,804,795 B2
(45) Date of Patent: Aug. 12, 2014

(54) METHOD OF REDUCING INTERFERENCE BETWEEN WIRELESS RECEPTION AND WIRELESS TRANSMISSION AND CORRESPONDING APPARATUS (75) Inventors: Philippe Gilberton, Cesson Sevigne Cedex (FR); Jean-Yves Le Naour, Cesson Sevigne Cedex (FR); Patrick Fontaine, Cesson Sevigne Cedex (FR)

(73) Assignee: Thomson Licensing, Issy-les-Moulineaux (FR)

( * ) Notice: Subject to any disclaimer, the term of this patent is extended or adjusted under 35 U.S.C. 154(b) by 49 days.

(21) Appl. No.: 13/518,057

(22) PCT Filed: Dec. 9, 2010

(86) PCT No.: PCT/EP2010/069250
§ 371 (c)(1),
(2), (4) Date: Jun. 21, 2012

(87) PCT Pub. No.: WO2011/076576
PCT Pub. Date: Jun. 30, 2011

(65) Prior Publication Data
US 2012/0257654 A1    Oct. 11, 2012

(30) Foreign Application Priority Data
Dec. 22, 2009  (EP) .................................... 09306312

(51) Int. Cl.
*H04B 1/38*         (2006.01)
(52) U.S. Cl.
USPC ................. 375/219; 455/73; 710/1

(58) Field of Classification Search
USPC ........................................................ 375/219
See application file for complete search history.

(56) References Cited

U.S. PATENT DOCUMENTS

| 5,563,895 | A  | * | 10/1996 | Malkamaki et al. ......... 714/748 |
| 7,660,565 | B2 | * | 2/2010  | Patel et al. ................. 455/132 |
| 8,095,164 | B2 | * | 1/2012  | Bednekoff et al. .......... 455/522 |
| 8,280,064 | B2 | * | 10/2012 | Prather et al. ................ 381/60 |
| 8,416,078 | B2 | * | 4/2013  | Sayegh et al. ............. 340/568.8 |
| 2006/0292987 | A1 |  | 12/2006 | Ophir et al. |
| 2007/0066228 | A1 | * | 3/2007  | Leinonen et al. ......... 455/67.11 |
| 2007/0070896 | A1 | * | 3/2007  | Alapuranen et al. ......... 370/230 |
| 2007/0232358 | A1 |  | 10/2007 | Sherman |
| 2007/0238482 | A1 |  | 10/2007 | Rayzman et al. |
| 2009/0225692 | A1 | * | 9/2009  | Son .............................. 370/312 |
| 2009/0241163 | A1 | * | 9/2009  | Seo .............................. 725/139 |
| 2009/0310543 | A1 | * | 12/2009 | Kim et al. .................... 370/329 |
| 2011/0150084 | A1 | * | 6/2011  | Choi et al. ............... 375/240.12 |

FOREIGN PATENT DOCUMENTS

WO    WO 2006/128948    12/2006

OTHER PUBLICATIONS

Search Rept: Apr. 6, 2011.

* cited by examiner

*Primary Examiner* — Santiago Garcia
(74) *Attorney, Agent, or Firm* — Myers Wolin LLC (57) ABSTRACT The present invention generally relates to digital communications, and more particularly, to a method and a device for sharing wireless transmission of first data and wireless reception of second data and an apparatus implementing the method.

8 Claims, 6 Drawing Sheets

METHOD OF REDUCING INTERFERENCE BETWEEN WIRELESS RECEPTION AND WIRELESS TRANSMISSION AND CORRESPONDING APPARATUS

This application claims the benefit, under 35 U.S.C. §365 of International Application PCT/EP2010/069250, filed Dec. 9, 2010, which was published in accordance with PCT Article 21(2) on Jun. 30, 2011 in English and which claims the benefit of European patent application No. 09306312.1, filed Dec. 22, 2009.

1. FIELD OF INVENTION

The present invention generally relates to digital communications, and more particularly, to a method and a device for sharing wireless transmission of first data and wireless reception of second data and an apparatus implementing the method.

2. TECHNICAL BACKGROUND

With ever increasing numbers of mobile receivers, and the use of many different standards, such as GSM, UMTS, WiFi, GPS, DVB-T/DVB-H, WiMAX, the demand for available radio frequencies are more and more difficult to satisfy. For example, cellular network frequency bands are overloaded in most parts of the world. However, with the switchover from analogue to digital television some bands of the UHF spectrum will be cleared. The freed radio frequencies might be used for, among others, mobile television services and wireless broadband services. It creates an opportunity for service providers and product manufacturers to propose new usages for mobile terminals, and will incite manufacturers of mobile multimedia terminals to integrate more and more functions that were previously present in separate devices.

In the context of reuse of the freed frequencies of the UHF band, one of the major problems to solve is to allow simultaneous access, by a mobile terminal, to services that use different, but relatively close frequencies. If no measures are taken, a transmission by the terminal related to a service on a certain frequency will perturb or make impossible a simultaneous reception by the same terminal of another service on an adjacent frequency, due to the indirect coupling (capacitive, conductive or inductive) of the antennas operating on the near frequencies and due to the physical proximity of the antennas inside the compact mobile terminal. This phenomenon is also called crosstalk. For a same frequency spacing, crosstalk can perturb simultaneous emission and reception on adjacent frequencies in various degrees, depending on reception/emission power.

According to prior art, the problem is partially handled using frequency rejection filters (RF rejection filters), but the allocated frequencies for the different types of emissions/receptions differ from country to country, which results in mobile terminals being equipped with series of rejection filters in order to be able to use a same mobile terminal in various countries. Also, the constraints imposed on RF rejection filters in order to allow a good functioning of the mobile terminal are very high, or even impossible to satisfy, when the frequencies used for simultaneous transmission and reception are close. Other prior art solutions, such as described in US 200710238482A1 (Rayzman et al), and US 200610292987A1 (Ophir et al) are related to coordination between multiple transceivers, allocate different, non-overlapping time slots to be used exclusively by each of a multiple of transceivers. US 200710232358A1 (Sherman) further describes coexistence between a Bluetooth (BT) and a WiMAX transceiver (Worldwide Interoperability for Microwave Access), a BT transceiver is activated during WiMAX silence periods. The WiMAX silence periods may be imposed by the BT transceiver if the WiMAX traffic is not sufficiently sparse to allow BT transmissions.

These prior art solutions are not optimized for transmission of first data and reception of second data with real-time constraints where the transmission of the first data causes interference in the reception of the second data. This is for example the case when the first data is mobile broadband data and the second data is mobile television data.

3. SUMMARY OF THE INVENTION

In order to alleviate at least some of the inconveniences of prior art, the invention comprises a method of reducing interference between transmission of first data by a wireless transceiver and reception of second data by a wireless receiver, the method comprising a step of reception of the second data by the wireless receiver, the second data being received in a form of a data burst, a step of first determination of characteristics of the reception of the second data, the characteristics comprising at least a burst on-time of the data burst and a burst periodicity of the data burst, a step of second determination of a time period for transmission, via the wireless transceiver, of at least part of the first data, the second determination taking into account the characteristics, a step of transmission, during the time period, and via the wireless transceiver, of a request for reservation of a time slot for transmission of at least part of the first data, a step of reception, via the wireless transceiver, of information representative of a time slot reservation, and a step of transmission, via the wireless transceiver, of the at least part of the first data during the reserved time slot.

According to a variant of the method of reducing interference, the characteristics comprise at least one of the following:
  a signal/noise ratio of reception of the second data is higher than a determined level;
  a measured bit-error rate of received the second data is higher than a determined level;
  information representative of a time of reception of different layers of scalable video encoded second data; and
  any combination of previous characteristics.

According to a variant of the method of reducing interference, the wireless receiver is a mobile television receiver.

According to a variant of the method of reducing interference, the wireless transceiver is a Worldwide Interoperability for Microwave Access (WiMAX) transceiver.

According to a variant of the method of reducing interference, the request for reservation of a time slot is repeated if the reserved time slot was not sufficient to transmit all of the first data.

According to a variant of the method of reducing interference, no request for reservation of a time slot is transmitted when a remaining time between the start of a next burst is below a determined threshold.

According to a variant of the method of reducing interference, any reservations of time slots for transmission of the at least part of the first data are cancelled by the transmission, via the wireless transceiver, of at least one reservation cancel request when the time period for transmission ends.

The invention also concerns a device, the device comprising a first determinator for determination of characteristics of reception of first data by a wireless receiver, the first data being received in a data burst, the characteristics comprising at least a burst on-time of the data burst and a burst periodicity of the data burst; and the device further comprising a second determinator for determination of a time period for transmission by a wireless transceiver of at least part of the second data, the second determinator taking into account the characteristics.

4. LIST OF FIGURES

More advantages of the invention will appear through the description of particular, non-restricting embodiments of the invention. The embodiments will be described with reference to the following figures.

5. DETAILED DESCRIPTION OF THE INVENTION

Figure 1:
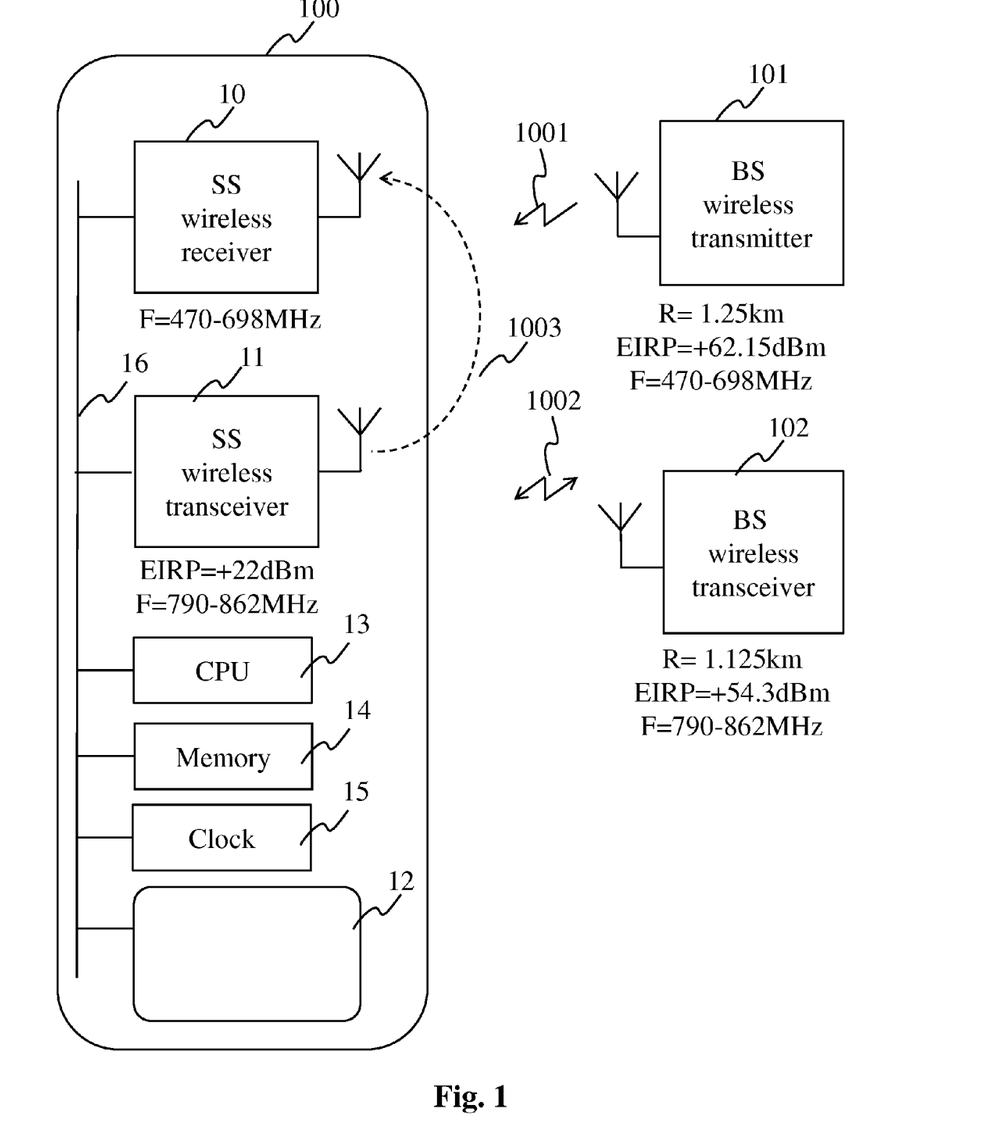
FIG. 1 shows an example device which is subject to implement an embodiment of the invention.

FIG. 1 shows an example device 100 where implementation of the invention would increase the performance of the device. Here, the invention would allow among others reduction of interference between a receiver and a transmitter/receiver in the device and optimized transmission and reception.

Device 100 is for example a compact mobile transmitter/receiver device giving a user access to both reception of a mobile television service distributed via Base Station 101 and to wireless broadband reception and transmission (e.g. wireless Internet) via Base Station 102. Device 100 is further equipped with a rendering- and input device 12, e.g. a touch screen. A Central Processing Unit CPU 13 controls the functioning of the device and is connected with each of the components 10, 11, 14, 15 and 12 via a data bus 16. A memory 14 allows to store data and programs needed for the functioning of the device and a clock 15 provides time references to the components of the device.

Inside device 100, a wireless receiver 10 for reception of mobile television is equipped with an antenna from which it receives the mobile television data 1001 emitted by Base Station 101. Further inside device 100 is a wireless transceiver 11 for transmission and reception of broadband data. The latter receives via its antenna broadband data emitted by Base Station 102. Wireless transceiver 11 also transmits broadband data to Base Station 102. The transmission and reception of both the Base Station 102 and the mobile receiver 100 is illustrated by arrow 1002.

As is illustrated by dotted arrow 1003, transmission by wireless transceiver 11 interferes on good reception of the mobile television data 1001 by wireless receiver 10. This is due to the relative frequency proximity of the wireless signals emitted by wireless broadband transceiver 11 and mobile television Base Station 101, and/or due to the proximity of the receiver 10 and transceiver 11 in the compact mobile device 100 and/or due to the proximity of their respective antennas.

Example figures of emission radius, emission power and signal frequency are indicated for each of the BS 101, BS 102, wireless receiver 10 and wireless transceiver 11.

For BS 101, the emission radius R=1.25 km. This corresponds to the maximum distance between the transmitter and receiver for reception of the signals emitted by BS 101. The emission power EIRP (for equivalent isotropically radiated power) of BS 101 is 62.15 dBm (dBm is an abbreviation for the power ratio in decibels of the measured power referenced to one milliwatt). The frequency of the signal emitted by BS 101 ranges from 470 to 698 MHz (Mega Hertz).

For BS 102, the figures are: emission radius R=1.125 km, EIRP=54.3 dBm, and frequency range 790-862 MHz.

Wireless receiver 10 receives signals emitted on frequency range 470 to 698 MHz.

Wireless transceiver 11 receives/transmits signals in a frequency range of 790 to 862 MHz. Its emission power EIRP is 22 dBm.

Figure 2:
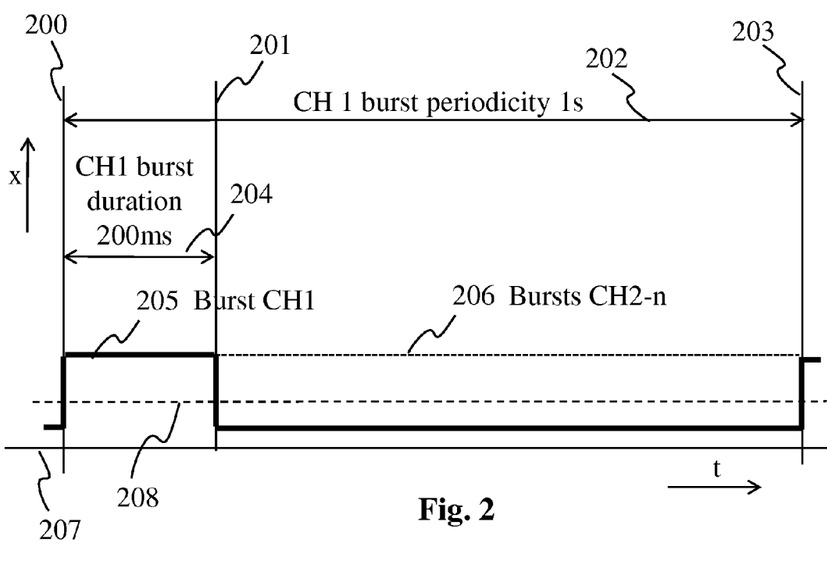
FIG. 2 shows a composition of wireless data, such as a mobile television signal received by a device according to an embodiment of the invention.

FIG. 2 shows a composition of a data signal such as a mobile television signal received by wireless receiver 10 inside mobile device 100, from Base Station (BS) 101.

The data signal received is a continuous signal (205, 206), comprising serialized, periodical transmission of several television channels. The data for each television channel is sent in bursts, in a faster-than-real-time manner, allowing the device 100 to receive data and turn the wireless receiver 10 off during reception of data from other television channels in which it is not interested, until the next data burst. This feature allows the device 100 to make important savings on its power consumption. The data for a specific channel is among others characterized by a burst duration 204 and a burst periodicity 202.

All of this is illustrated in FIG. 2. The figure shows vertically (200) the signal amplitude and horizontally (207) the time. During a time 205, a data burst is received for channel 1. Then, at time 201, the data burst for channel 1 is stopped and the signal continues during time 206 with data bursts of other channels, until time 203, where a next data burst is received comprising data for channel 1. The diagram further shows data burst duration 204, for example 200 ms, and a data burst periodicity 202 of 1 s. The data burst duration and data burst periodicity values given here as an example are typical values used in the DVB-H (Digital Video Broadcasting—Handheld) standard. According to this standard, in order to allow the receiver to switch off between the end of the on-time of a data burst 205 for a channel of interest and the start of a new data burst 203 of the channel of interest, the data burst comprises information that allows the receiver to know what the duration and the periodicity of the data burst is. Typically, the "time slice and FEC descriptor—max burst duration" and "real time parameters—delta_t" are present at each start of a data burst and allows the receiver to know the data burst duration 205 and delay time until a next data burst will be received 206. If the receiver changes channel, it acquires the parameters for the data burst that holds data for the new channel.

Dotted line 208 shows the average bit rate of the data transmitted in the data burst for channel 1. It shows that the bursty transmission is providing the receiver with enough data to avoid data starvation.

Figure 3:
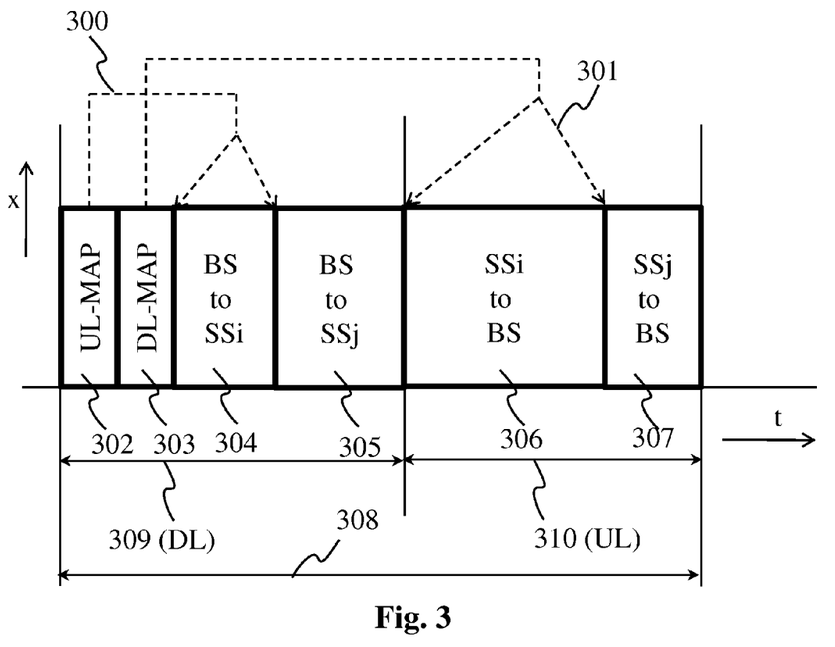
FIG. 3 illustrates some principles of reception and transmission of data by a transceiver inside a receiver/transmitter device such as wireless transceiver inside the device of FIG. 1.

FIG. 3 illustrates some principles of the format of a signal such as exchanged between wireless transceiver 11 and BS 102. According to a specific embodiment of the invention, the wireless transceiver 11 uses the IEEE 802.16 or WiMAX standard. Specifically of interest here is that WiMAX differs from WiFi (IEEE 802.11) by its Media Access Controller (MAC). WiFi MAC uses contention access; all Subscriber Stations (SSs) that wish to pass data through a BS compete for the BS's attention on a random interrupt basis. This can cause an SS to be repeatedly interrupted by other SS, greatly reducing the throughput of the interrupted SS. By contrast, WiMAX MAC uses a scheduling algorithm for which the SS needs to compete only once (for initial entry into the network using a reservation or bandwidth request); after that it is reserved a time slot by the BS. The time slot can enlarge and contract, but remains assigned to the SS, which means that other SSs cannot use it.

FIG. 3 shows a typical WiMAX transmission/reception frame 308. The Frame comprises UL-MAP 302 and DL-MAP 303 data blocks, for UpLink Map and DownLink map. The UL-MAP and DL-MAP comprise information that indicate the starting time slot of each data burst, illustrated by dotted arrows 300 and 301. Within the transmission frame 308 is a downlink subframe 309 and an uplink subframe 310. The downlink subframe 309 corresponds to a transmission of the BS (for example BS 102 of FIG. 1). The uplink subframe corresponds to a transmission by two Subscriber Stations SSi and SSj. For example, SSi is represented by wireless transceiver 11 inside mobile device 100 of FIG. 1. In slot 304, the Base Station 102 sends data to SSi 11. In slot 305, the Base Station 102 sends data to SSj. In slot 306, SSi 11 sends data to the Base Station 102. In slot 307, SSj sends data to the Base Station 102. So, when the SSi 11 and SSj have received UL-map 302 and DL-map 303, they know when they can expect to receive data and when they are allowed to transmit data. For an SSi or SSj that wants to get a time slot reserved by the Base Station 102 for data upload, i.e. in the uplink frame, the SS must start by requesting a time slot. To do so, it sends an uplink Bandwidth Request (BR), also called a reservation request. If the SS has no uplink slot reserved yet, the SS can send the BR in contention. Otherwise, if the SS has already an uplink slot reserved, and the SS needs additional bandwidth, it can issue additional BRs during the uplink time slot. An SS may also send a BR to indicate that it does no more want to have any uplink bandwidth, i.e. a reservation cancel request.

Figure 4:
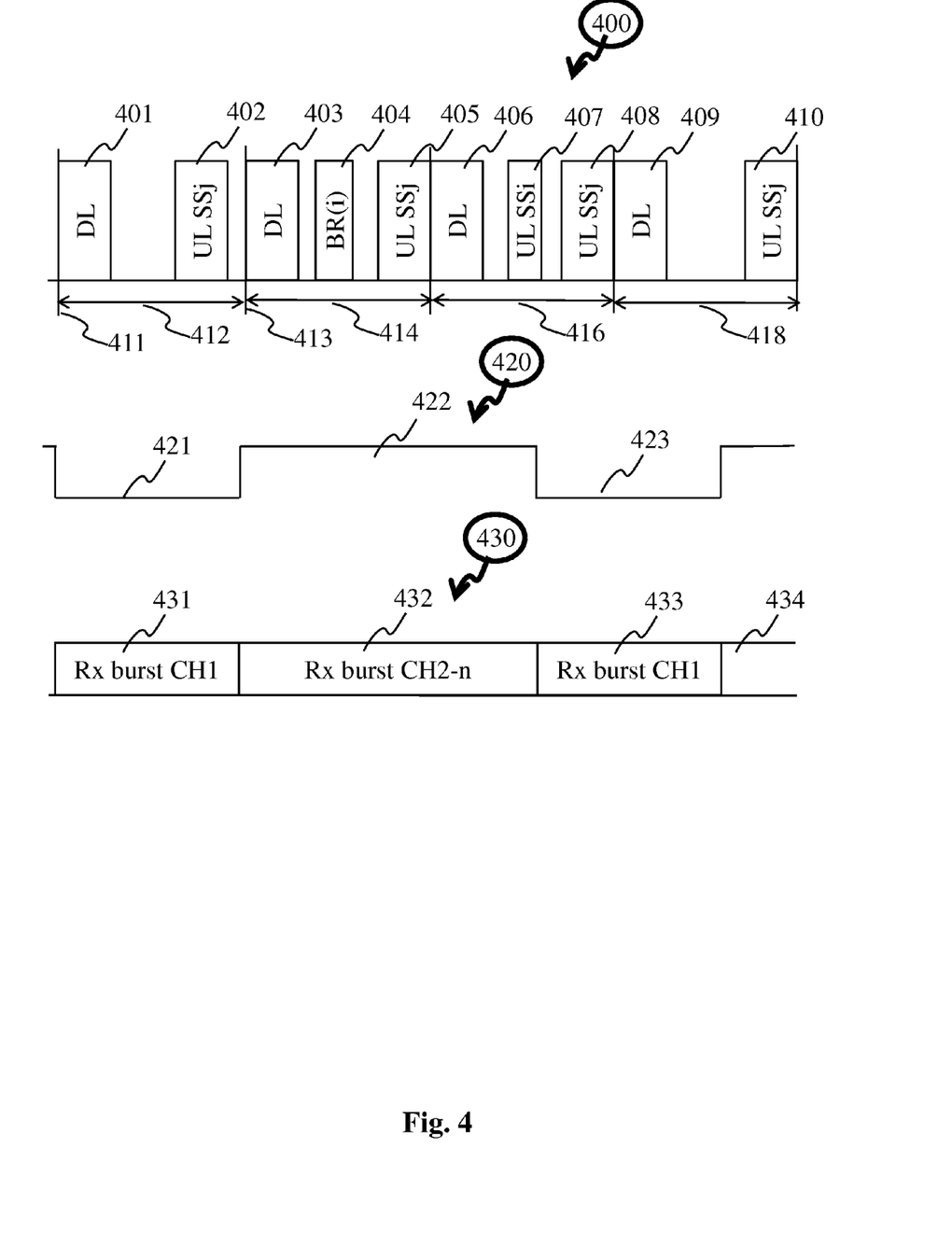
FIG. 4 illustrates an embodiment of the invention showing reception of data by a wireless receiver and transmission/reception frames as transmitted/received by a wireless transceiver.

FIG. 4 shows an embodiment of the invention. Timeline 400 represents a timeline with four data transmission/reception frames, such as according to the WiMAX standard. Timeline 420 represents opportunities for transmission by a transmitter, such as broadband transceiver 11 of device 100 of FIG. 1, to transmit data. Timeline 430 represents data received, for example DVB-H mobile television data sent by BS 101 and received by wireless receiver 10 of FIG. 1.

The embodiment of the invention is illustrated for two Subscriber Stations SSi and SSj. SSi corresponds to wireless transceiver 11. SSj corresponds to another device.

On timeline 430, 431 and 433 represent a reception, by the mobile receiver 10 of device 100, of a burst of data comprising a mobile television channel 1. 432 and 434 represent a reception of data bursts for mobile television channels 2 to n.

On timeline 420, 422 represents an opportunity, for broadband transceiver 11 of device 100, to transmit data. 421 and 423 represent moments in time where data transmission by transceiver 11 would in a certain extent create interference on the reception of data received by wireless receiver 10.

On timeline 400 are four transmission/reception frames that are managed by Base Station 101, namely frames 412, 414, 416 and 418. The transmission/reception frame start is indicated by 411 for frame 412 and by 413 for frame 414. The frames contain time slots that are reserved for transmission by each of the Base Station 101, SSi, and SSj. The time slots are either Uplink (UL) or Downlink (DL) time slots. A Downlink timeslot is used by the BS 101 to transmit data to Subscriber Stations such as SSi and SSj and allow these SSs to download data from the BS. Uplink timeslots are used by Subscriber Stations such as SSi and SSj to upload data to the BS. Frame 412 comprises Downlink (DL) time slot 401 and Uplink (UL) time slot 402. Uplink timeslot 402 is reserved for data transmission by Subscriber Station SSj. In frame 414, there is again a Downlink time slot 403, but also a Bandwidth Request BR (i) or reservation request 404 and again an Uplink time slot 405 for transmission of data by SSj. In frame 406, there is a Downlink time slot 406, an Uplink time slot 407 for SSi, and an Uplink time slot 408 for SSj. In frame 418 there is a Downlink time slot 409 and an Uplink time slot 410 for SSj. According to the embodiment of the invention, transmission of data by wireless transceiver 11 is avoided when wireless receiver 10 receives data from the channel which it is interested in. These moments correspond to 421 and 423 of timeline 420, and to RX burst CH1 431 and 433 of timeline 430. As can be seen in timeline 400, there is no Uplink activity from the wireless transceiver 11 SSi in device 100 during the reception of the data burst for channel 1 by wireless receiver 10 in device 100.

The transmissions of wireless transceiver 11 (SSi) are thus synchronized with the reception of data by wireless receiver 10, in the following way. After tuning of wireless receiver 10 to television channel 1, wireless transceiver 11 emits in the off-time 432 of the burst for channel 1 a Bandwidth Request BR(i) or reservation request 404 in transmission/reception frame 414. Base Station 102 allocates an Uplink timeslot for SSi based on the BR(i). In the next transmission/reception frame 416, SSi 11 receives in transmission/reception frame 416, in Downlink time slot 406, a DL-MAP, which comprises the reference to an Uplink time slot that the BS 102 has allocated for SSi 11. SSi 11 then uploads (part of) the data that it needs to transmit to BS 102 during the Uplink time slot 407 that the Base Station 102 reserved for it. If the Uplink time slot is located in the on-time of the reception of channel 1 by wireless receiver 10, the wireless transceiver 11 transmits no data. If the Uplink time slot overlaps the on-time of the reception of channel 1 by wireless receiver 10, the wireless transceiver 11 stops transmitting data when it enters the on-time of the reception of channel 1 by wireless receiver 10.

According to a variant embodiment of the invention, no reservation request for a time slot or BR is transmitted when a remaining time between the start of a next burst is below a determined threshold. This feature allows to avoid obtaining time slots for transmission that cannot be used, because they are positioned in the burst on-time. Time slots that are obtained by a Subscriber Station that cannot be used, cannot be used by any other Subscriber Stations neither, and thus result in potential bandwidth loss for these other Subscriber Stations. According to a particular embodiment of the invention the threshold is determined as follows: if a current transmission/reception frame does not end before the end of the current burst, no reservation request for a time slot is sent. According to a variant embodiment, the above embodiments are combined, giving the advantages of a more intelligent transmission of reservation requests, and thus provide an optimized use of available bandwidth for all SSs.

In FIG. 4, the timelines are given as an example. In an implementation of the invention in an environment of reception of DVB-H television signals and WiMAX broadband reception/transmission, the on-time of a burst for a given channel ranges from 100 ms to 300 ms, and the periodicity of the burst ranges from 1 s to 3 s. A WiMAX transmission/reception frame has typically a duration of 2.5-20 ms. The duration of the off-time of the DVB-H signal is thus largely superior to the duration of a WiMAX transmission/reception frame, which leaves enough time for the WiMAX transceiver to transmit data. However, depending on the characteristics of the DVB-H channel tuned to, the duration of the on-time may inhibit certain types of data traffic. The delay caused by the synchronization of the WiMAX transmission with the reception of the DVB-H data may be too long to allow transmission and reception of data traffic having a low latency requirement via the wireless transceiver 11, for example voice-type data transmission. For this type of use, variant embodiments are possible, which will be handled further on, see the description of FIGS. 5 and 6.

Figure 5:
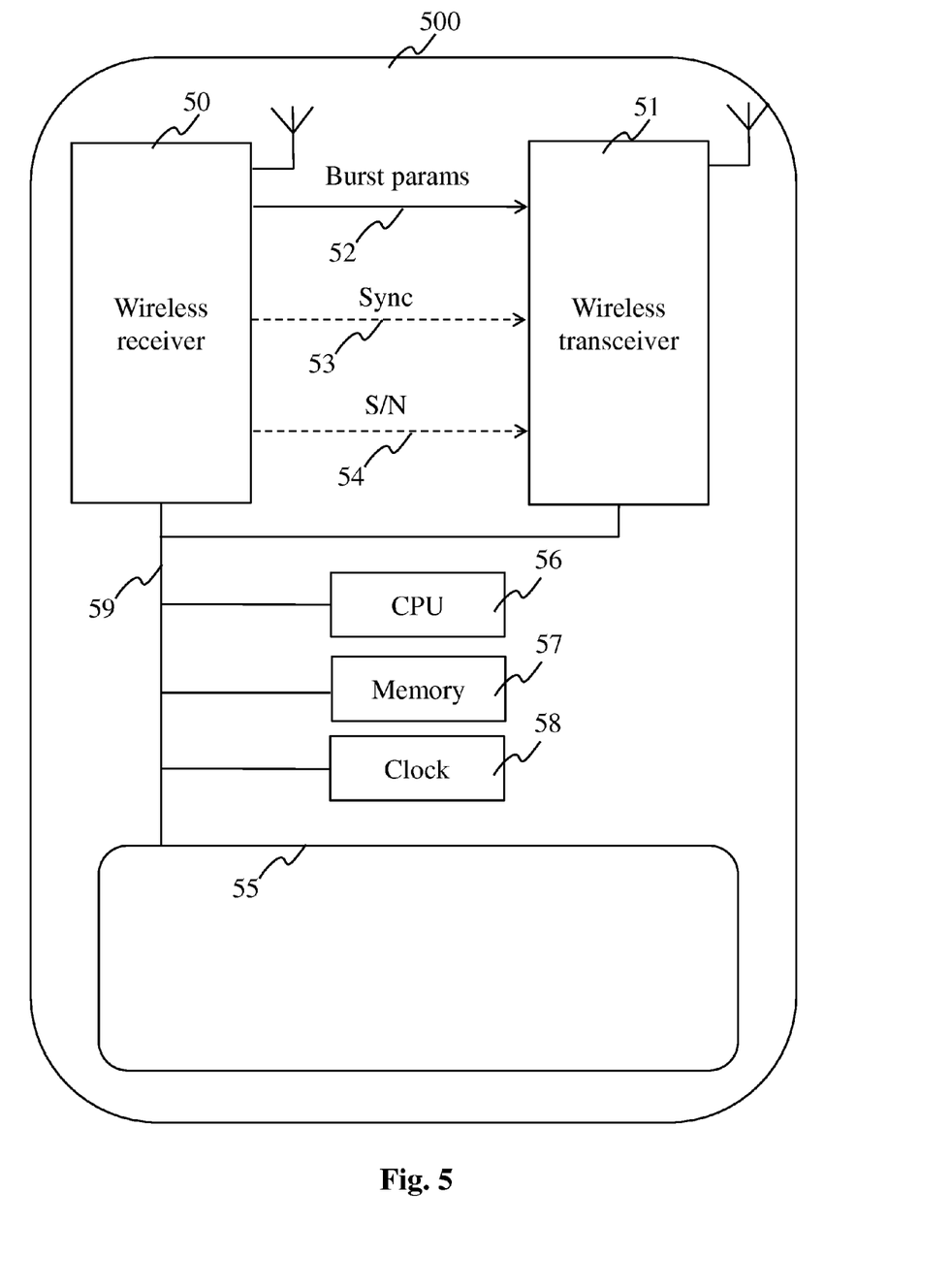
FIG. 5 shows an example of a device implementing an embodiment of the invention.

FIG. 5 shows an example of a device 500 implementing an embodiment of the invention. The device 500 represents an enhancement of device 100 of FIG. 1 according to a particular embodiment of the invention. Device 500 is further equipped with with a rendering- and input device 55, e.g. a touch screen. A Central Processing Unit CPU 56 controls the functioning of the device and is connected with each of the components 50, 51, 55, 57 and 58 via a data bus 59. A memory 57 allows to store data and programs needed for the functioning of the device and a clock 58 provides time references to the components of the device.

The wireless receiver 50 communicates characteristics of reception to wireless transceiver 51 so that the wireless transceiver 51 can reduce interference with the reception of a received mobile television channel received by wireless receiver 50, i.e. the data transmissions of wireless transceiver 51 are synchronized with the reception of data by wireless receiver 50. To this end, wireless receiver 50 transmits information to wireless receiver 51 on burst parameters, such as burst on-time, and burst periodicity, illustrated by arrow 52. According to a variant embodiment, wireless receiver 50 further transmits to wireless receiver 51 information on the moments of burst start and stop, i.e. a synchronize signal, illustrated by arrow 53. According to a variant embodiment, wireless receiver 50 also transmits to wireless transceiver 51 a signal/noise ratio reception characteristic that is representative of the reception quality of the signal received by wireless receiver 50. This allows enhanced cooperation between the receiver/transceiver as is further described by means of FIG. 6. Arrows 52, 53 and 54 represent data flows. According to a particular embodiment, these dataflows are transmitted via one or more separate connections between wireless receiver 50 and wireless transceiver 51, or, according to a different embodiment, via the data bus 59.

The above embodiment is a mere example embodiment of the invention. Other embodiments are possible while still using the principles of the invention. For example, the wireless receiver 50 and wireless transceiver 51 are implemented on separate devices, and the transmission of the characteristics of reception are transmitted via a communication link between the devices 50 and 51.

Figure 6:
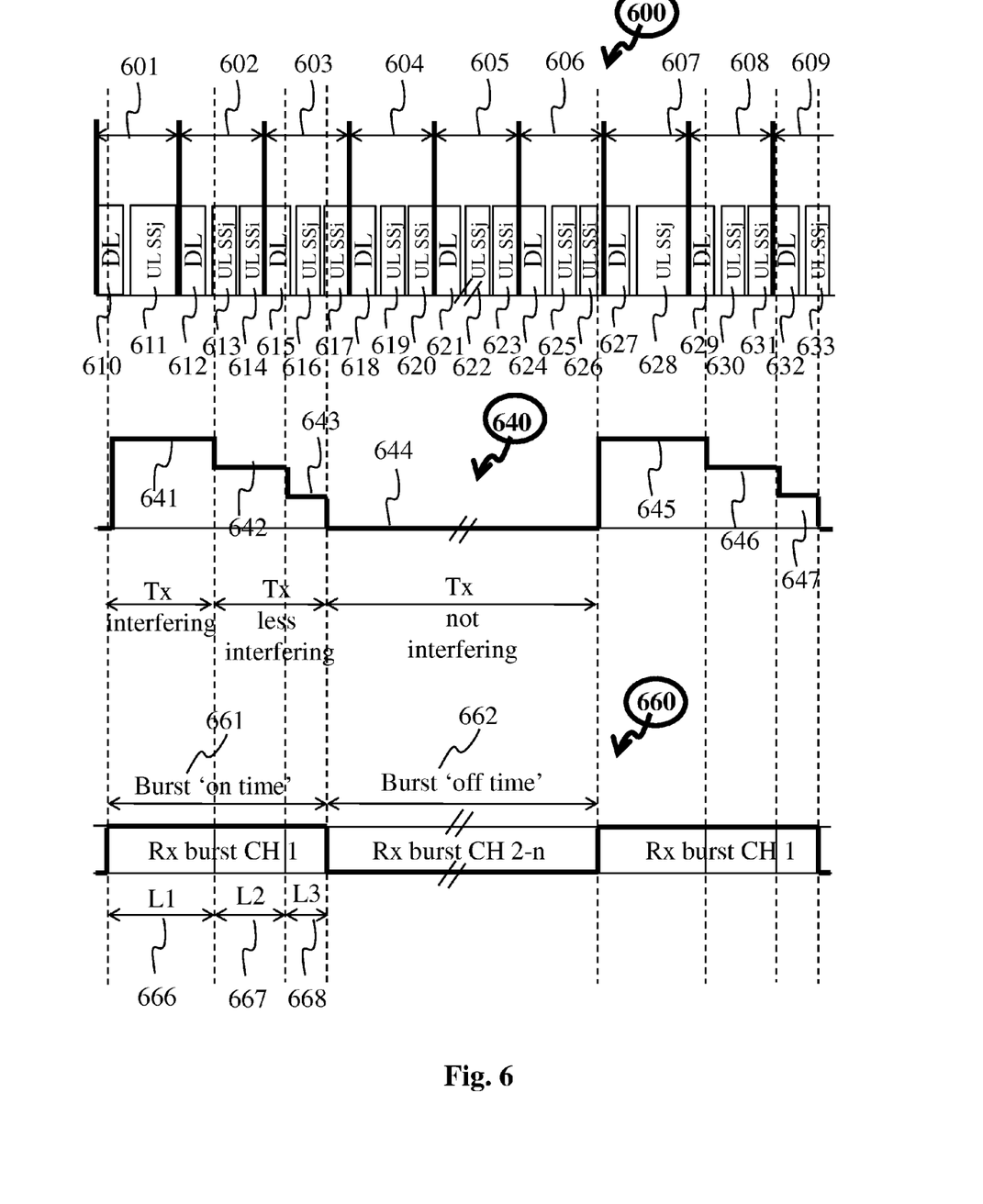
FIG. 6 shows a variant embodiment of the invention allowing, under certain circumstances, transmission of data by a wireless transceiver during burst reception by wireless receiver inside a device implementing the particular embodiment of the invention.

FIG. 6 shows a variant embodiment of the invention allowing, under certain circumstances, transmission of data by wireless transceiver 51 during burst reception by wireless receiver 50. This variant embodiment has the advantage to allow types of data traffic on a wireless broadband link that require low latency and jitter.

A timeline 660 shows the data received by wireless receiver 50. A timeline 640 shows the influence of simultaneous transmission of wireless transceiver 51 on the quality of a video rendering from data received from wireless receiver 50. A timeline 600 shows WiMAX transmission/reception frames as managed by a Base Station such as BS 102 of FIG. 1.

According to this variant embodiment of the invention, the data received by wireless receiver 50 for a channel in which device 500 is interested in, here channel 1, is Scalable Video Encoded (SVC) video data. According to this variant, the characteristics of reception of the data received by wireless receiver 50 then comprises information representative of a time of reception of different layers of scalable video encoded second data.

SVC allows rendering of video in different levels of quality of reception. The SVC-encoded video data comprises data for a low quality of reception in a base layer L1, and additional data in an enhancement layer L2, which combined with the base layer L1 data, will allow to render a same video with a medium quality; and second additional data in an enhancement layer L3, which, when combined with L2 data and L1 data, allows to render a same video with a high quality. The SVC data is encoded in a first base layer 666, a second enhancement layer 667 and a third enhancement layer 668. The principle of operation of this variant embodiment is based on the idea that for reception of SVC encoded video, transmission of data by wireless transceiver 51 is allowed not only during the off-time 662 of the burst 661-662 for channel 1, but also during the on-time 661 of the burst 661-662 for channel 1 during the time of reception of data from one or more of the SVC enhancement layers 667 and 668. Timeline 640 shows the importance of the degradation of the quality of rendering of video data received via wireless receiver 50 during simultaneous transmission by wireless transceiver 51. If wireless transceiver 51 transmits data during the reception of the SVC base layer L1 666 by wireless receiver 50, the impact on the reduction in quality is at its highest (641). If wireless transceiver 51 transmits data during the reception of data from the first enhancement layer 667 L2 by wireless receiver 50, the reduction in rendering quality is less important, leaving the SVC video data from the base layer intact. If wireless transceiver 51 transmits data during the reception of data from the second enhancement layer 668 L3 by wireless receiver 50, the reduction in rendering quality is even less important, because it can damage only data in the second enhancement layer, leaving the data from both the base layer and the first enhancement layer intact. During the off-time 662, there is no reduction in rendering quality, the wireless receiver 50 consuming the data received during the on-time of the burst for channel 1. As has been shown, during the reception of data belonging to enhancement layers L2 667 and L3 668, simultaneous transmission of data by wireless transceiver 51 is thus possible in addition to transmission during the off-time 662. This feature has the advantage to reduce the time period that the wireless transceiver 51 is not allowed to transmit data, thereby reducing data transmission latency for data transmissions via wireless transceiver 51, and making other types of data traffic possible, requiring low transmission latency.

Transmission of data by wireless transceiver 51 is illustrated by means of timeline 600. Frame 601 comprises a Downlink (DL) part in which the Base Station, such as BS 102 of FIG. 1, downloads data to Subscriber Stations, among which is wireless receiver 51. The example illustrated here assumes two Subscriber Stations, i.e. SSi for wireless receiver 51 and SSj for another device. It is further assumed that both SSi 51 and SSj reserve sufficient bandwidth to nearly completely occupy the transmission/reception frames. According to the principles of the variant embodiment of the invention, no data is transmitted by wireless transceiver 51 during the reception of the SVC base layer data by wireless receiver 50. Frame 601 is thus filled with only DL data and UL data from SSj, while SSi 51 remains silent. In frames 602-606 and 608, the available Uplink space is shared between UL blocks for SSj and SSi 51. In frame 607, there is again no UL block for SSi 51.

For this variant embodiment, referring to FIG. 5, a transfer of additional information on reception characteristics is thus necessary from 50 to 51, in order to communicate to 51 the position of L2 667 and L3 668 related data in Rx burst 661.

According to a variant embodiment, the decision for simultaneous transmission of data by transceiver 51 during reception of data by receiver 50 is based on a user preference, a user preference for example never allowing simultaneous transmission (so only transmission by transceiver 51 during the burst off-time), or allowing also transmission during the reception of L3 data, or, allowing also transmission during the reception of L2 data. This user preference can be based on a user giving different priorities to reception of data destined to wireless receiver 50 and transmission of data by wireless transceiver 51.

According to a variant embodiment, the decision for simultaneous transmission is taken by the device 500 itself, based or not on a global user preference.

Other information that can interfere with the decision of device 500 to allow simultaneous transmission of data by transceiver 51 during the reception of data by receiver 50 is the signal/noise ratio (S/N) of the data received by receiver 50. If the S/N is at a determined level, i.e. the signal strength is high and there is a low level of noise, simultaneous transmission may be allowable, because a simultaneous transmission and reception probably resulting in little, perhaps repairable, damage to the data received by receiver 50. According to a variant embodiment, the decision to allow simultaneous transmission by transceiver 51 and during reception of data by receiver 50 is based on measurement of the bit error rate (BER). According to a variant embodiment of the invention, one or more of the previously described embodiments are combined so as to allow for a particularly optimized management of the cohabitation between the wireless receiver 50 and the transceiver 51. For example, if the S/N or the BER allows it, simultaneous transmission by transceiver 51 during all of the burst on-time (and off course during the burst off-time), is allowed. But when the S/N or the BER drops below a given threshold (e.g. error rate too high), the simultaneous transmission is restricted, for example, simultaneous transmission is avoided during reception of base layer (L1) data by receiver 50.

According to a particular embodiment of the invention, wireless receiver 50 comprises a determinator for determination of characteristics of the reception of data received via wireless receiver 50. These characteristics comprise at least a burst on-time of the data burst and a burst periodicity of the data burst. Wireless transceiver 51 comprises another determinator for determination of a time period for transmission, via the wireless transceiver 51, of at least part of the data it wants to transmit. This determination takes into account the characteristics of reception of data received via wireless receiver 50.

According to a variant embodiment of the invention, the determinators are implemented by a management function that communicates with both wireless receiver 50 and wireless transceiver 51.

According to a different variant embodiment, the determinators are implemented by a CPU (Central Processing Unit) running a dedicated program.

According to yet another variant embodiment, the determinators are implemented by a chip, such as an ASIC (Application Specific Integrated Circuit).

According to a variant embodiment of the invention, the management function is implemented by a specific device, connected via communication means to the wireless receiver 50 and to wireless transceiver 51.

Figure 7:
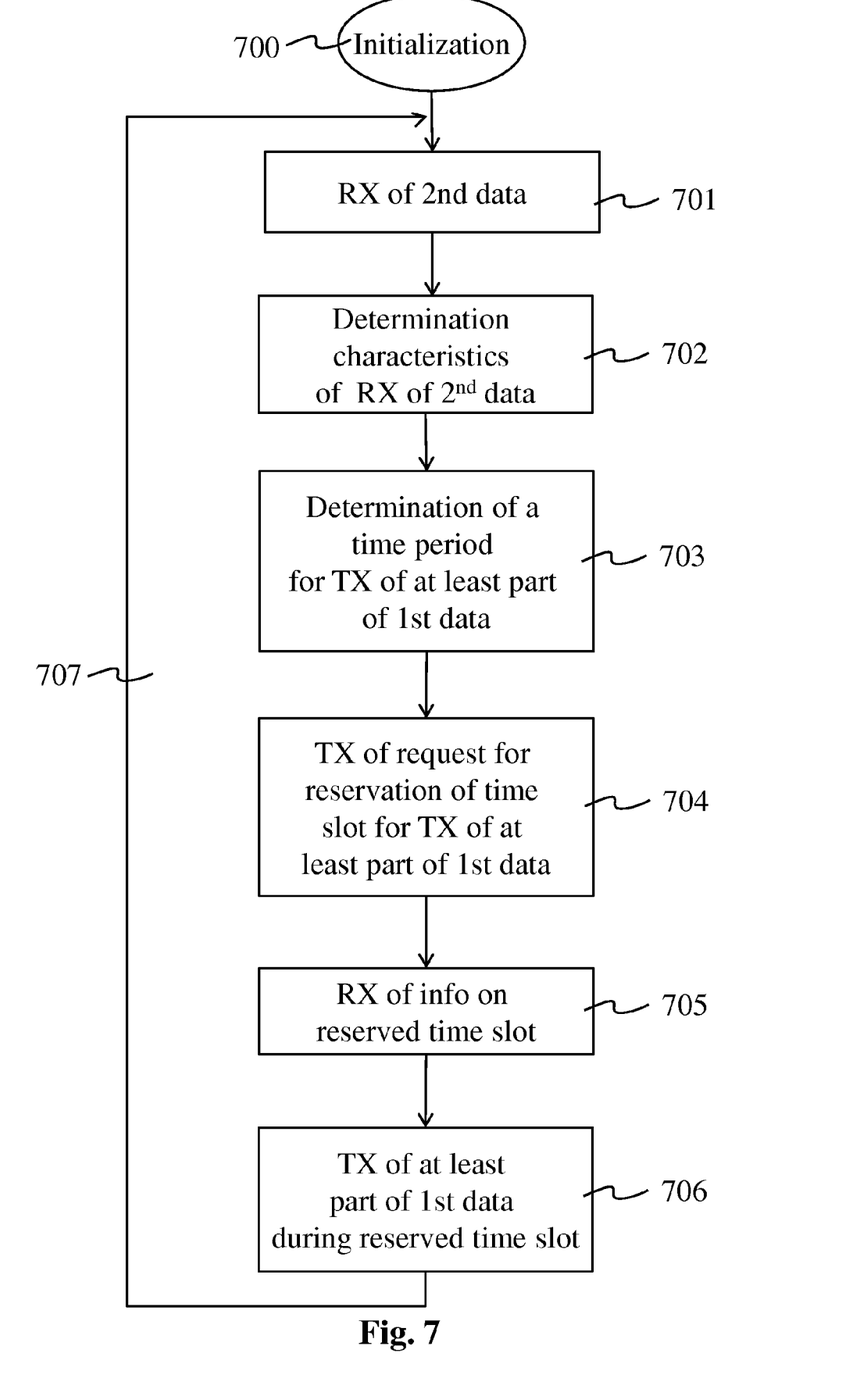
FIG. 7 shows an algorithm of a method according to a particular embodiment of the invention.

FIG. 7 shows an algorithm of a method according to a particular embodiment of the invention. The algorithm can for example be implemented by device 500.

The algorithm starts with an initialization step 700 in which variables needed for the execution of the algorithm are allocated and initialized.

Then, in a step 701, second data is received in the form of a burst via a wireless receiver. The second data is for example mobile television data received from a base station by wireless television receiver 50 of device 500. The burst has for example the form as illustrated on timeline 430 of FIG. 4 or time 660 of FIG. 6.

In a first determination step 702, characteristics are determined, of the reception of the second data. These characteristics comprise at least a burst on-time and a burst periodicity of the burst. The burst on-time and burst periodicity is for example according to 661, respectively 662 of FIG. 6.

In a second determination step 703, a time period is determined for transmission, via a wireless transceiver (e.g. 51 of device 500 of FIG. 5), of at least part of first data (e.g. broadband data). The time period for transmission of at least part of the first data takes into account the characteristics of the reception of the second data, i.e. comprising at least the burst on-time and the burst periodicity. The time period for transmission corresponds for example to 422 of timeline 420 of FIG. 4, or to 644 of timeline 640 of FIG. 6, or, according to a variant embodiment, to 643 and possibly 644 (e.g. this time period corresponds to the reception by 50 of L3 SVC video second data for channel 1 plus the period of no reception of second data for channel 1), or, according to yet another variant embodiment, to 642 and possibly 643 and 644 (e.g. this time period corresponds to the reception by 50 of L2 SVC video second data for channel 1 plus the period of reception of second data for L3 video for channel 1 plus the period of no reception of second data for channel 1).

In a transmission step 704, a request for reservation of a time slot for transmission of at least part of the first data is transmitted during the time period that was determined in step 703. This request for reservation of a time slot corresponds to, for example, BR(i) or reservation request 404 of FIG. 4 illustrated on timeline 400. Alternatively, this corresponds to a transmission of an additional reservation of a time slot for transmission of at least part of the first data during an uplink time slot that was already reserved for the wireless transceiver 51, which is the case when the base station keeps the time slot reserved on next transmission/reception frames until the wireless transceiver 51 informs the BS that it cancels the reservation. Alternatively, the request for reservation is repeated one or more times before the time period for transmission as determined in step 703 ends, if there is new first data to transmit. In the case where the base station keeps a reserved time slot reserved on next transmission/reception frames, the wireless transceiver 51 can send cancel reservation request to the BS before the end of the time period for transmission determined in step 703, thereby freeing the space that it no longer needs, and thus allowing other subscriber stations to transmit their data in the freed time slot(s).

In a reception step 705, information representative of a time slot reservation is received from the wireless transceiver. This corresponds for example to a time slot reservation that can be determined from a received DL-MAP that is received in Downlink time slot 406 of timeline 400 of FIG. 4, or that is received in downlink time slot 618 of timeline 600 of FIG. 6. According to a variant embodiment of the invention, the information representative of a time slot reservation corresponds to information received in a DL-MAP that is received in downlink time slot 615 of timeline 600 of FIG. 6, or, according to yet another embodiment, to information that is received in a DL-MAP that is received in downlink time slot 612 of timeline 600 of FIG. 6.

In a final transmission step 706, the wireless transceiver transmits at least part of the first data during the reserved time slot.

The algorithm is then reiterated starting with step 701.

In this document example embodiments have been illustrated by means of a mobile device integrating a wireless receiver/wireless transceiver. Other examples devices in which the invention can be applied to improve performance by reducing interference between reception and transmission is a mobile telephone device, giving for example access to reception of mobile television and reception/transmission of UMTS (Universal Mobile Telecommunications System) telephony. In fact, the invention can be applied to any device integrating at least one broadcast receiver receiving a TDM (Time-Division Multiplexing) type signal and at least one receiver/transmitter transmitting data in reserved time slots. Example time division multiplexed broadcast signals that are applicable to the invention are DVB-H, DVB-H2 (2nd generation DVB-H), MediaFLO, ATSC M/H (Advanced Television Systems Committee—Mobile/Handheld). Examples of technologies that use time slot reservation that are applicable to the invention are WiMAX and LTE (Long-Term Evolution).

The example embodiments are based on cohabitation of a wireless receiver and a wireless transceiver in a same device. The invention can also be implemented by separate wireless receiver and transceiver devices, whenever there is interference caused by transmission of one device on the reception by another. As an example, the invention can be implemented on a separate wireless receiver device, and a separate WiMAX enabled device; when the wireless receiver device reception is perturbed by WiMAX traffic, it can signal the WiMAX enabled device to synchronize its WiMAX transmissions according to the invention.

The invention may be completely built from software components running on a general-purpose device such as a Personal Computer, and the invention can then be implemented using a mix of hard- and software components. According to a particular embodiment, the invention is entirely implemented in hardware, for example as a dedicated component (for example as an ASIC, FPGA or VLSI) (respectively Application Specific Integrated Circuit, Field-Programmable Gate Array and Very Large Scale Integration) or as distinct electronic components integrated in a device or in a form of a mix of hardware and software.

The invention claimed is:

1. A method of synchronization between transmission of first data by a wireless transceiver and reception of second data by a wireless receiver, wherein the method comprising:
receiving said second data by said wireless receiver, said second data being received in a form of a data burst;
determining characteristics of said receiving of said second data, said characteristics comprising a burst on-time of said data burst, a burst periodicity of said data burst, and information representative of a time of reception of different layers of said second data when said second data is encoded according to a scalable video encoding, said scalable video encoding comprising a base layer and at least one enhancement layer for rendering said second data with different quality;
determining a time period for transmission, via said wireless transceiver, of at least part of said first data based upon said characteristics, said time period for transmission comprising a burst off-time of said data burst and said time period for transmission comprising said on-time of said data burst corresponding to a reception of said second data from said at least one scalable video enhancement layer when said second data is encoded according to said scalable video encoding;
transmitting, during said time period, and via said wireless transceiver, a request for reservation of a time slot for transmission of at least part of said first data;
receiving, via said wireless transceiver, information representative of a time slot reservation; and
transmitting, via said wireless transceiver, said at least part of said first data during said reserved time slot, when said reserved time slot is in said determined time period for transmission.

2. The method according to claim 1, wherein said characteristics comprise at least one of the following:
a signal/noise ratio of reception of said second data is higher than a determined level;
a measured bit-error rate of received said second data is higher than a determined level;
information representative of a time of reception of different layers of scalable video encoded second data; and
any combination of previous characteristics.

3. The method according to claim 1, wherein said wireless receiver is a mobile television receiver.

4. The method according to claim 1, wherein said wireless transceiver is a Worldwide Interoperability for Microwave Access transceiver.

5. The method according to claim 1, wherein said request for reservation of a time slot is repeated if said reserved time slot was not sufficient to transmit all of said first data.

6. The method according to claim 1, wherein no request for reservation of a time slot is transmitted when a remaining time between the start of a next burst is below a determined threshold.

7. The method according to claim 1, wherein any reservations of time slots for transmission of said at least part of said first data are cancelled by the transmission, via said wireless transceiver, of at least one reservation cancel request when said time period for transmission ends.

8. A device, wherein the device comprises:
a first determinator for determination of characteristics of reception of first data by a wireless receiver, said first data being received in a form of a data burst, said characteristics of reception of first data comprising a burst on-time of said data burst, a burst periodicity of said data burst, and information representative of a time of reception of different layers of said second data when said second data is encoded according to a scalable video encoding, said scalable video encoding comprising a base layer and at least one enhancement layer for rendering said first data with different quality;
a second determinator for determination of a time period for transmission by a wireless transceiver of at least part of said second data, said second determinator taking into account said characteristics of reception of first data, said time period for transmission comprising a burst off-time of said data burst and said time period for transmission comprising said on-time of said data burst corresponding to a reception of said second data from said at least one scalable video enhancement layer when said second data is encoded according to a said scalable video encoding;

said wireless transceiver for transmitting, during said time period, a request for reservation of a time slot for transmission of at least part of said first data;

said wireless receiver for receiving information representative of a time slot reservation; and said wireless transceiver for transmitting said at least part of said first data during said reserved time slot, when said reserved time slot is in said time period for transmission determined by said second determinator.

\* \* \* \* \*